United States Patent [19]

Angres et al.

[11] 4,158,649
[45] Jun. 19, 1979

[54] POLYMERIC MEMBRANES WHICH CONTAIN POLYPHENYLQUINOXALINES AND WHICH ARE USEFUL AS BATTERY SEPARATORS

[75] Inventors: Isaac Angres, Silver Spring; James V. Duffy, Beltsville; Sol J. Matesky, Hyattsville, all of Md.

[73] Assignee: The United States of America as represented by the Secretary of the Navy, Washington, D.C.

[21] Appl. No.: 843,002

[22] Filed: Oct. 17, 1977

[51] Int. Cl.$^2$ .......................... C08L 1/10; C09K 3/00
[52] U.S. Cl. ................................... 260/17 R; 260/823; 260/874; 429/248; 429/254
[58] Field of Search ...................... 260/17 R, 823, 874; 429/248, 254

[56] References Cited

U.S. PATENT DOCUMENTS

| 2,317,711 | 4/1943 | Andre | 136/31 |
| 2,542,527 | 2/1951 | Honey et al. | 260/2.5 M |
| 2,676,929 | 4/1954 | Duddy | 260/2.5 M |
| 3,629,161 | 12/1971 | Paine | 429/254 |
| 3,766,141 | 10/1973 | Augl et al. | 260/49 |
| 3,875,270 | 4/1975 | Haefner et al. | 429/254 |

OTHER PUBLICATIONS

Hergenrother et al., *J. Polymer Sci.*, 5, 1967, pp. 1453–1466.

*Primary Examiner*—M. J. Welsh
*Attorney, Agent, or Firm*—R. S. Sciascia; A. L. Branning; R. D. Johnson

[57] ABSTRACT

A polymeric membrane composed of a homogenous mixture of (1) a hydrophilic resin which is (a) partially acetylated cellulose in which from about 50 to less than 100 percent of the hydroxyl groups are acetylated, (b) polyvinyl acetate, (c) hexadimethrine bromide, or mixtures thereof, and (2) a polyphenylquinoxaline of the formula

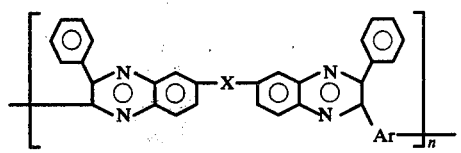

wherein x is a direct bond,

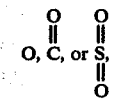

and Ar is m-phenylene, p-phenylene, or

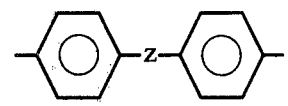

wherein z is a direct bond,

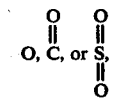

and wherein n is a value such that the polyphenylquinoxaline has an inherent viscosity of from about 0.5 to about 2.5 dl./g as a 0.5 g in 100 ml solution in 98 percent sulfuric acid at about 30° C. These polymeric membranes are used as separators in alkaline cells such as silver-zinc cells.

34 Claims, No Drawings

POLYMERIC MEMBRANES WHICH CONTAIN POLYPHENYLQUINOXALINES AND WHICH ARE USEFUL AS BATTERY SEPARATORS

BACKGROUND OF THE INVENTION

This invention relates to polymeric membranes and more particularly to polymeric membranes which are used as separators in alkaline cells.

The principal requirements of a battery separator used in a conventional alkaline electrolyte battery are maximum chemical stability and a low electrical resistance for maximum diffusion of electrolyte in order to minimize the internal resistance of the over-all assembly. Other necessary properties include, sufficient mechanical strength to withstand handling during assembly of the battery, shape or dimensional stability when wet with electrolyte, and sufficient density to resist piercing of the separator and possible short circuit of the cell by metallic growths.

Separators for alkaline batteries have been formed of cellulosic or modified cellulosic materials. For example, U.S. Pat. No. 2,317,711 (Apr. 27, 1943) to Andre, discloses a secondary battery in which the positive active plate is formed of a substance such as silver oxide, silver peroxide, or combinations thereof, the negative plate is formed of zinc, and separation of the respective electrodes is achieved by wrapping the positive plate within a membrane of regenerated cellulose. Although alkaline electrolyte battery separators made of cellulosic or modified cellulosic materials are satisfactory initially, extended exposure to standard alkaline electrolytes breaks down these materials. As a result, the separator loses its initial insulating properties and is pierced readily by the growth or "tracing" of the metallic components, thereby severely limiting the life cycle of a secondary battery of this type.

Microporous polymeric films have also been used as battery separators; the manufacture of such films is disclosed in U.S. Pat. No. 2,542,527 (issued Feb. 20, 1951) and U.S. Pat. No. 2,676,929 (issued Apr. 27, 1954). In these patented processes, polymeric materials such as polyvinyl chloride or polyethylene are admixed with finely-ground starch particles and the mixture cast into sheets. Thereafter, by successive treatments and washing in both acid and alkaline media the starch particles are hydrolyzed and dissolved, leaving voids of approximately the same size as the original particles. Principal disadvantages of this procedure are the difficulty in controlling the size of pores in finished membrane and the difficulty in achieving pores of the order of 1000–2000 A. Pores of this size are desirable in alkaline silver-zinc and similar cells.

SUMMARY OF THE INVENTION

Accordingly, it is an object of this invention to provide a novel battery separator membrane for use in alkaline cells.

Another object of this invention is to provide a battery separator membrane which resists oxidation and corrosion in strong alkaline electrolytes.

A further object of this invention is to provide a battery separator membrane having a low electrical resistance.

Still another object of this invention is to provide a method for compatibilizing polyphenylquinoxalines with partially acetylated cellulose, polyvinyl acetate, and hexadimethrine bromide.

These and other objects of this invention are accomplished by providing a polymeric membrane comprising a homogeneous mixture of:

(1) from about 30 to about 50 weight percent of a hydrophilic resin which is
  (a) a partially acetylated cellulose in which from about 50 to less than 100 percent of the hydroxyl groups are acetylated,
  (b) polyvinyl acetate,
  (c) hexadimethrine bromide, or
  (d) mixtures thereof; and (2) from about 50 to about 70 weight percent of a polyphenylquinoxaline of the formula

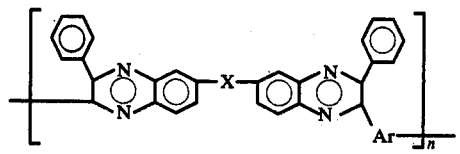

wherein x is a direct bond,

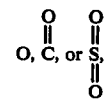

and Ar is m-phenylene, p-phenylene, or

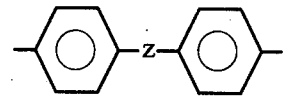

wherein Z is a direct bond,

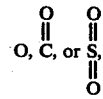

and wherein n is a value such that the polyphenylquinoxaline has an inherent viscosity of from about 0.5 to about 2.5 dl./g. as a 0.5 g. in 100 ml solution in 98 percent sulfuric acid at about 30° C.

The polymeric membrane is produced by dissolving the hydrophilic resin and the polyphenylquinoxaline in chloroform, casting the resulting solution on a plate, allowing the chloroform to evaporate until cloudiness is observed, immersing the plate and material in a 1:1 by volume methanol/water solution for at least 10 minutes, removing the membrane from the solution, and, finally, drying the membrane.

The polymeric membranes of this invention are useful as separators in alkaline cells such as silver-zinc cells.

DETAILED DESCRIPTION OF THE PREFERRED EMBODIMENT

The polymeric membrane of the present invention is composed of a homogeneous mixture of from about 30 to about 50 weight percent of a hydrophilic resin which is a partially acetylated cellulose in which from about 50 to less than 100 percent of the hydroxyl groups are acetylated, polyvinyl acetate, hexadimethrine bromide, or mixtures thereof with from about 50 to about 70 weight percent of a polyquinoxaline of the formula

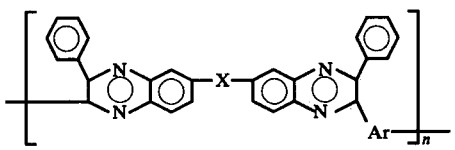

wherein X is a direct bond,

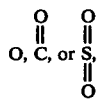

and Ar is m-phenylene, p-phenylene, or

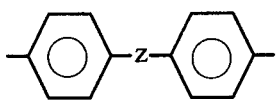

wherein Z is a direct bond,

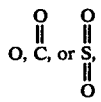

and wherein n is a value such that the polyphenylquinoxaline has an inherent viscosity of from about 0.5 to about 2.5 dl./g. as a 0.5 g in 100 ml solution in 98 percent sulfuric acid at about 30° C.

The weight percentages of hydrophilic resin and polyphenylquinoxaline are based on the dry weight of the membrane, i.e. excluding chloroform, m-cresol, and electrolyte. If the hydrophilic resin does not constitute at least about 30 weight percent of the membrane, the electrical resistance of the membrane will be too high for use as a separator in silver-zinc cells. On the other hand, for the membrane to have sufficient mechanical strength and resistance to chemical attack by alkaline electrolytes, it must contain at least about 50 weight percent the polyphenylquinoxaline. The preferred ranges are from 40 to 50 weight percent of the hydrophilic resin and from 50 to 60 weight percent for the polyphenylquinoxaline. The most preferred composition for the membrane is 40 weight percent of the hydrophilic resin and 60 weight percent of the polyphenylquinoxaline.

Partially acetylated cellulose in which from about 50 to less than 100 percent of the hydroxyl groups are acetylated, polyvinyl acetate, and hexadimethrine bromide are used as the hydrophilic resin components. Hexadimethrine bromide (Chemical Abstracts Registry Number 9011-04-5; tradename Polybrene) is available from the Aldrich Chemical Company. Processes for producing the partially acetylated celluloses by treating cellulose with acetic anhydride are well known in the art. Commonly, the cellulose is fully acetylated to produce cellulose triacetate with no less than 92 percent of the hydroxyl groups acetylated. Partial hydrolysis of the cellulose triacetate may then be used to produce cellulose acetate with from 52 to 56 percent of the hydroxyl groups acetylated. (*Merck index*, 9th ed., monograph number 1920). Of the partially acetylated celluloses, cellulose acetate and cellulose triacetate are preferred because they are widely available commercially. A list of cellulose acetate and cellulose triacetate trade names is given by Kirk and Othmer in the *Encyclopedia of Chemical Technology*, volume 1, (Interscience, New York, 2nd ed., 1964) pp. 109-138. Cellulose acetate is more preferred because it provides a membrane with lower electrical resistance.

As examples 1-4 demonstrate, the hydrophilic resins may be in the form of powders (example 1), granules (example 2), pellets pressed from powder (example 3), or flakes (example 4). The sizes and shapes of the hydrophilic resin particles are not critical because the hydrophilic resins are dissolved in chloroform to form true homogeneous solutions. However, finely divided powders are preferred because they dissolve in the chloroform more quickly.

Methods of preparing the polyphenylquinoxalines used in the polymer membranes of the present invention are disclosed in U.S. Pat. No. 3,766,141, issued Oct. 16, 1973, entitled "Polyquinoxalines Containing Flexibilizing Groups in the Polymer Chain," by Joseph M. Augl and Wolfgang J. Wrasidlo, hereby incorporated by reference. The Augl et al patent also includes methods of preparing polyphenylquinoxalines containing —S— and —SO— linkages. These polyquinoxalines are excluded from the membranes of the present invention because the —S— and —SO— will be oxidized by the strong alkaline electrolytes, resulting in degradation of the membrane.

The molecular weight range of polyphenylquinoxalines used to prepare the membranes of this invention may vary from that of polyphenylquinoxalines which have an inherent viscosity of 0.5 dl./g. to that of polyphenylquinoxalines which have an inherent viscosity of 2.5 dl./g. either as a 0.5 g. in 100 ml solution in 98 percent sulfuric acid at about 30° C. or as a 0.5 g. in 100 ml of m-cresol solution at 30° C.

M-cresol is commonly used as the solvent-catalyst in the production of the polyphenylquinoxaline; generally, the product polyphenylquinoxalines are soluble in the m-cresol. The polyphenylquinoxaline used in examples 1-4 was obtained from the manufacturer as a 10 percent by weight solution in m-cresol. As examples 1-4 demonstrate, m-cresol does not interfere with the membrane making process. On the other hand, m-cresol is not necessary to the process. Therefore, polyquinoxalines may be used which are either in dry form or dissolved in m-cresol.

The use of chloroform in the present process is critical. Even such closely related solvents as carbon tetrachloride and methylene chloride were found not to be suitable for this process. It is necessary that both the hydrophilic resin and the polyphenylquinoxaline are dissolved to form homogeneous true solutions in chloroform. These solutions are then blended together to form a single solution with both the hydrophilic resin and the polyphenylquinoxaline distributed uniformly throughout the solution. Removal of the chloroform (and m-cresol if present) produces a homogeneous mixture of the hydrophilic resin and the polyphenylquinoxaline.

The homogeneous solution of hydrophilic resin and polyphenylquinoxaline in chloroform may be cast into a membrane by any conventional procedure, as for example by means of a doctor blade, spraying, dipcoating, or spinning. In the examples, the hydrophilic resin-polyquinoxaline solution was evenly coated over a clean, flat surface using a doctor blade. Next, the chloroform is allowed to evaporate from the solution coating until the coating turns cloudy. The hydrophilic resin polyphenylquinoxaline coating is then submerged in a 1:1 by volume methanol/water solution for at least 10 minutes to leach out the chloroform and any other solvents which might be present. The 1:1 by volume methanol/water solution was found to be the best solution for this purpose. Finally, hydrophilic resin-polyphenylquinoxaline membrane is dried.

For use in alkaline cells such as alkaline silver-zinc cells, the membrane is wetted with the electrolyte by conventional methods.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLES

The polyphenylquinoxaline used in examples 1 through 4 was purchased from Narmco Division of the Whittaker Corporation and had the general formula

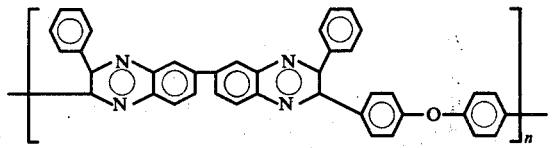

The reported inherent viscosity for this polymer is 2.05 (dl./g.) and the glass transition temperature is 693° K. (430° K.) (see P. Hergenrother and H. Levin, *J. Polymer Science*, A-1, 5, 1453-1466 (1967)).

EXAMPLE 1

Thirty grams of a solution of 10 percent by weight of the polyphenylquinoxaline in m-cresol was dissolved in 40 ml of chloroform. Two grams of a finely divided cellulose acetate powder was dissolved in 60 ml of chloroform to form a second solution. The cellulose acetate (Aldrick Chemical Co., 1977-78 Catalogue. No. 18100-5) had an acetyl content of 39.8 percent, a density of 1.30 grams/cc, and a melting transition temperature of 240° C. The two solutions were mixed together and then stirred to obtain a homogeneous blend in solution. A glass plate (16 cm × 28 cm × 9 mm) was thoroughly washed with water and detergent and then rinsed with isopropyl alcohol to insure good wetting by the blended cellulose acetate-polyphenylquinoxaline solution. The membrane was then formed by spreading the cellulose acetate-polyphenylquinoxaline solution onto the glass plate with a metal bar to form a uniform coating. The thickness of the final film was controlled by means of masking tape (3 layers of tape were used to give a membrane with a thickness of approximately 1 mil when dry) which was placed along the edges of the glass plate. The chloroform was then slowly evaporated from the cellulose acetate-polyphenylquinoxaline solution until cloudiness of the glass plate occurred. Next the plate and membrane were immersed in a 1:1 by volume methanol/water solution for at least 10 minutes to leach the chloroform and m-cresol solvents from the membrane. The film was then removed from the methanol/water solution and dried. The membrane when saturated with 45 percent potassium hydroxide had a wet thickness of 2 mils and an electrical resistance of 40–70 ohm-cm. The average flux of OH ions ($\Delta m/(A\Delta t)$) was $3.12 \times 10^{-3}$ moles/(min inch$^2$).

EXAMPLE 2

The procedure of example 1 was repeated using granules of cellulose triacetate (Aldrich Chemical Company) instead of cellulose acetate. A cellulose triacetate-polyphenylquinoxaline membrane having an electrical resistance of 200–300 ohm-cm was obtained.

EXAMPLE 3

The procedure of example 1 was repeated using pellets of a low molecular weight polyvinyl acetate (Aldrich Chemical Company; 1977-78 Catalogue No. 18949-9) instead of cellulose acetate. The low molecular weight polyvinyl acetate had a density of 1.18 grams/cc. and a Ford number 4 viscosity of 13–14.5 seconds at 25° C. The resulting polyvinyl acetate-polyphenylquinoxaline membrane had an electrical resistance of 200–300 ohm-cm.

Medium molecular weight polyvinyl acetate (Aldrich Chemical Company; 1977-78 Catalogue No. 18948-0) having a Ford number 4 viscosity of 17–21 seconds at 25° C. and high molecular weight polyvinyl acetate (Aldrich Chemical Company; 1977-78 catalogue No. 18248-6) having a Ford number 4 viscosity of 24–30 seconds at 25° C. also produce satisfactory separator membranes, demonstrating that the molecular weight of the polyvinyl acetate is not a critical factor.

EXAMPLE 4

The procedure of example 1 was repeated using small flakes of hexadimethrine bromide (Polybrene) (Aldrich Chemical Company; 1977-78 catalogue no. 10768-9). The resulting hexadimethrine bromide-polyphenylquinoxaline membrane had an electrical resistance of 100–150 ohm-cm.

Because the hydrophilic resins are dissolved to form true homogeneous solutions of the hydrophilic resins in chloroform during the membrane manufacturing process, one would not expect the original form—weather powder, granules, pellets, or flakes, for instance—to be critical. Examples 1 through 4 demonstrate that this is in fact the case; the hydrophilic resin may be in the form of a powder (example 1), granules (example 2), pellets pressed from powder (example 3), or flakes (example 4). However, finely divided powders are preferred because they dissolve in chloroform more quickly.

Obviously numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A polymeric membrane comprising a homogeneous mixture of:
(1) from about 30 to about 50 weight percent of a hydrophilic resin which is selected from the group consisting of
(a) a partially acetylated cellulose in which from about 50 to less than 100 percent of the hydroxyl groups are acetylated,
(b) polyvinyl acetate, (c) hexadimethrine bromide, and
(d) mixtures thereof; and
(2) from about 50 to about 70 weight percent of a polyphenylquinoxaline of the formula

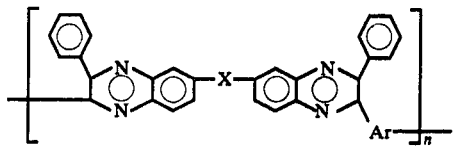

wherein X is selected from the group consisting of a direct bond,

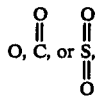

wherein Ar is selected from the group consisting of m-phenylene, p-phenylene, and

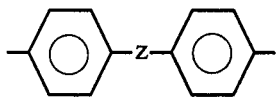

wherein Z is selected from the group consisting of a direct bond,

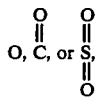

and wherein n has a value such that the polyphenylquinoxaline has an inherent viscosity of from about 0.5 to about 2.5 dl./g. as a 0.5 g. in 100 ml solution in 98 percent sulfuric acid at about 30° C.

2. The polymeric membrane of claim 1 wherein the hydrophilic resin is a partially acetylated cellulose in which from about 50 to less than 100 percent of the hydroxyl groups are acetylated.

3. The polymeric membrane of claim 2 wherein the hydrophilic resin is cellulose triacetate.

4. The polymeric membrane of claim 2 wherein the hydrophilic resin is cellulose acetate.

5. The polymeric membrane of claim 1 wherein the hydrophilic resin is polyvinyl acetate.

6. The polymeric membrane of claim 1 wherein the hydrophilic resin is hexadiamethrine bromide.

7. The polymeric membrane of claim 1 wherein X is a direct bond.

8. The polymeric membrane of claim 1 wherein X is O.

9. The polymeric membrane of claim 1 wherein X is C=O.

10. The polymeric membrane of claim 1 wherein X is O=S=O.

11. The polymeric membrane of claim 1 wherein Ar is m-phenylene.

12. The polymeric membrane of claim 1 wherein Ar is p-phenylene.

13. The polymeric membrane of claim 1 wherein Ar is

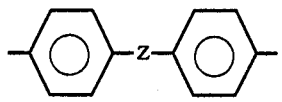

wherein Z is selected from the group consisting of a direct bond,

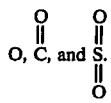

14. The polymeric membrane of claim 13 wherein Z is a direct bond.

15. The polymeric membrane of claim 13 wherein Z is O.

16. The polymeric membrane of claim 13 wherein Z is C=O.

17. The polymeric membrane of claim 13 wherein Z is O=S=O.

18. The polymeric membrane of claim 1 wherein the hydrophilic resin constitutes from 40 to 50 weight percent of the membrane and the polyphenylquinoxaline constitutes from 50 to 60 weight percent of the membrane.

19. The polymeric membrane of claim 18 wherein the hydrophilic resin is a partially acetylated cellulose in which from about 50 to less than 100 percent of the hydroxyl groups are acetylated.

20. The polymeric membrane of claim 19 wherein the hydrophilic resin is cellulose triacetate.

21. The polymeric membrane of claim 19 wherein the hydrophilic resin is cellulose acetate.

22. The polymeric membrane of claim 18 wherein the hydrophilic resin is polyvinyl acetate.

23. The polymeric membrane of claim 18 wherein the hydrophilic resin is hexadimethrine bromide.

24. The polymeric membrane of claim 18 wherein X is a direct bond.

25. The polymeric membrane of claim 18 wherein X is O.

26. The polymeric membrane of claim 18 wherein X is C=O.

27. The polymeric membrane of claim 18 wherein X is O=S=O.

28. The polymeric membrane of claim 18 wherein Ar is m-phenylene.

29. The polymeric membrane of claim 18 wherein Ar is p-phenylene.

30. The polymeric membrane of claim 18 wherein Ar is

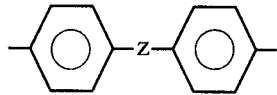

wherein Z is selected from the group consisting of a direct bond,

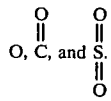

31. The polymeric membrane of claim 30 wherein Z is a direct bond.

32. The polymeric membrane of claim 30 wherein Z is O.

33. The polymeric membrane of claim 30 wherein Z is C=O.

34. The polymeric membrane of claim 30 wherein Z is O=S=O.

* * * * *